United States Patent [19]

Sorensen

[11] Patent Number: 4,869,228
[45] Date of Patent: Sep. 26, 1989

[54] EXPANSION SLEEVE FOR A GAS OR CHARCOAL BARBECUE

[76] Inventor: Robert Sorensen, 9403 - 82nd Street, Fort St. John, British Columbia, Canada

[21] Appl. No.: 264,043

[22] Filed: Oct. 28, 1988

[51] Int. Cl.$^4$ .......................... A47J 37/00; F24C 3/00
[52] U.S. Cl. .................................. 126/25 R; 126/9 R; 126/41 R; 126/216
[58] Field of Search ............ 126/9 R, 9 A, 9 B, 25 R, 126/38, 25 A, 214 R, 215, 216, 214 D, 29, 30

[56] References Cited

U.S. PATENT DOCUMENTS

| | | | |
|---|---|---|---|
| 1,946,008 | 2/1934 | White | 126/9 B |
| 3,005,451 | 10/1961 | Richart | 126/9 R |
| 3,791,368 | 2/1974 | Hunt | 126/9 R |
| 4,334,462 | 6/1982 | Hefling | 126/9 R |
| 4,598,690 | 7/1986 | Hsu | 126/9 R |
| 4,721,037 | 1/1988 | Blosnich | 126/25 R |
| 4,726,349 | 2/1988 | Gehrke | 126/9 R |

*Primary Examiner*—James C. Yeung
*Attorney, Agent, or Firm*—Sixbey, Friedman, Leedom & Ferguson

[57] ABSTRACT

The present invention provides an expansion sleeve for a gas barbecue of the type comprising a grill supporting base and a cover removably supportable thereon, the cover having lower edges seatably engaging upper edges of the base when supported thereon and in closed position. The sleeve has vertical walls defining a cross-sectional horizontal shape which conforms to the shape of these edges of the base and cover of the barbecue. The walls have spaced parallel upper and lower edges, the lower edges being provided with means to releasably seat the sleeve on the upper edges of the base and the upper edges arranged to seatably receive the cover. The sleeve, when in position on the base of the barbecue with the barbecue cover is seatably received on the upper edges of the sleeve provides an expanded cooking chamber for the barbecue.

8 Claims, 1 Drawing Sheet

EXPANSION SLEEVE FOR A GAS OR CHARCOAL BARBECUE

BACKGROUND OF THE INVENTION

The present invention relates to a barbecue accessory, and more particularly to an expansion sleeve which may be releasably secured to the base of a conventional gas or other type barbecue for expanding the cooking chamber of the barbecue.

Barbecues for cooking foods in the out-of-doors, and particularly for preparing foods by grilling, roasting and the like, are in common use today. They usually have a base in which charcoal, charcoal briquettes and the like are burned, or in which a propane gas burner is situated. This base also supports a grill within and, often, a hood on cover. The hoods or covers of such barbecues may be secured to the base by releasable hinge mechanisms to pivot between open and closed positions, or may be simply supported on the base. When the cover is in open position, access to the grill is provided. When it is in closed position, a cooking chamber is enclosed over the grill, so that food which is grilled or turned on a rotisserie within this cooking chamber may be cooked in an oven-like environment.

Of background interest to the present invention are U.S. Pat. Nos. 3,389,696 of Lake issued June 25, 1968 and 3,791,370 of Fauser issued Feb. 12, 1974, and Canadian Pat. Nos. 739,733 of Mell issued Aug. 2, 1966, and 978,043 of Tomlin issued Nov. 18, 1975. These patents all describe and illustrate different types of outdoor grills and barbecues for cooking food. Both the Lake and Fauser devices feature hoods which provide ovenlike cooking chambers when the hoods are in closed position. Canadian Pat. No. 1,198,642 of Vaughan issued Dec. 31, 1985 describes and illustrates a structure for supporting a rotisserie or shish kabob accessory over a spit or electric heating element.

It is an object of the present invention to provide a device which can fit conventional gas or charcoal outdoor barbecues of the type in question. It is a further object of the present invention to provide such a device which is adjustable to suit different sizes of barbecues.

SUMMARY OF THE INVENTION

In accordance with the present invention there is provided an expansion sleeve for a gas barbecue of the type comprising a grill-supporting base and a cover removably supportable thereon, the cover having lower edges seatably engaging upper edges of the base when supported thereon and in closed position. The sleeve has vertical walls defining a cross-sectional horizontal shape which conforms to the shape of these edges of the base and cover of the barbecue. The walls have spaced parallel upper and lower edges, the lower edges being provided with means to releasably seat the sleeve on the upper edges of the base and the upper edges arranged to seatably receive the cover. The sleeve, when in position on the base of the barbecue with the barbecue cover seated on the upper edges of the sleeve provides an expanded cooking chamber for the barbecue.

In a preferred embodiment, the sleeve is of rectangular configuration, adapted to fit a barbecue of the type having a base and a cover having respectively rectangular upper and lower edges. As well, the sleeve is provided with means on the walls thereof to slidably adjust the peripheral size of the sleeve to enable it to conform to the peripheral size of the upper edges of the base and the lower edges of the cover of the barbecue.

The sleeve in accordance with the present invention may be readily adapted to different types of barbecues and permits, for example, mounting of a rotisserie thereon, in slots appropriately provided along the upper edges of the sleeve. The sleeve permits the lifting of food farther away from the heat source to provide better control and quality of cooking. As well, it permits a significantly greater cooking space, when the barbecue cover is in position on the sleeve.

BRIEF DESCRIPTION OF THE DRAWINGS

These and other objects and advantages of the invention will become apparent upon reading the following detailed description and upon referring to the drawings in which.

Figure 1:
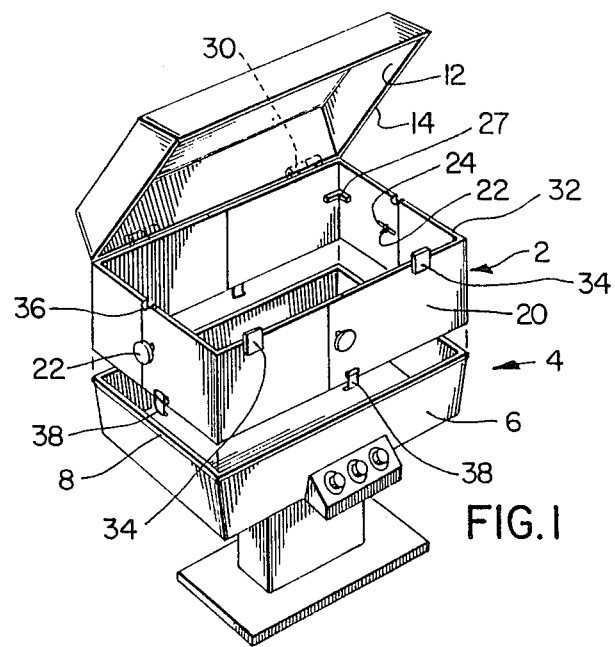
FIG. 1 is a perspective view of a barbecue expansion sleeve in accordance with the present invention in place on a conventional gas barbecue.

While the invention will be described in conjunction with example embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE INVENTION

In the drawings, similar features have been given similar reference numerals.

Figures 3, 4:
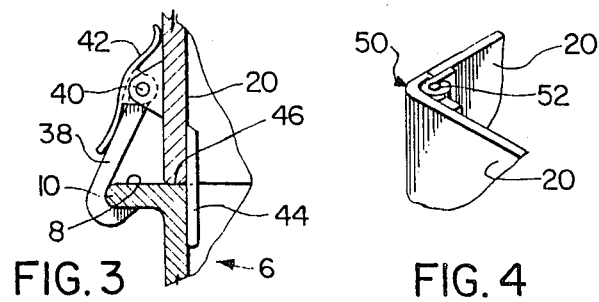
FIG. 3 is a schematic detail view of clamp means for securing the sleeve of FIGS. 1 and 2 to the barbecue base.
FIG. 4 is a schematic perspective of a corner section of the sleeve of FIG. 1, illustrating an alternative construction thereof.

Turning to the drawings, an expansion sleeve 2 in accordance with the present invention is illustrated in association with a conventional gas barbecue 4. Gas barbecue 4 comprises a generally rectangular base 6, having upper edges 8 in the form of a rectangular rim with an outwardly projecting lip 10 (FIG. 3). A cover or hood 12 for the barbecue is also provided, this hood normally being releasably secured to base 6 by means of hinge means (not illustrated) at the back of base 6, so that hood 12 can pivot between open position exposing the interior cooking chamber of barbecue 4, and closed position wherein the lower edges 14 of hood 12 rest on the upper edges 8 of base 6, to provide an enclosed cooking chamber for barbecue 4. Hood 12 has similarly a generally rectangular configuration along its lower edges 14.

Figure 2:
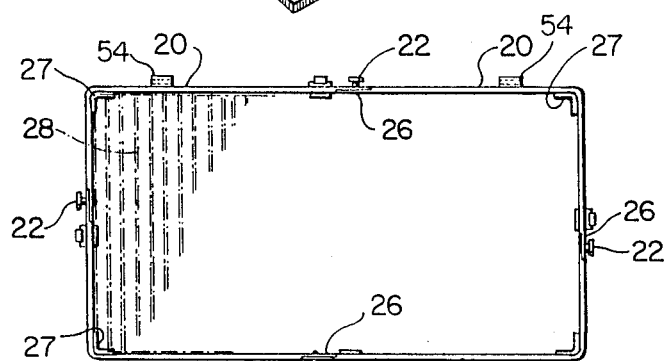
FIG. 2 is a plan view of the sleeve of FIG. 1.

Expansion sleeve 2 is made up of vertical walls 20 having a cross-sectional shape, in the horizontal plane conforming to the peripheral contour of upper edges 8 and lower edges 14, for example in the illustrated embodiment that contour being rectangular. Obviously if the barbecue base 6 and hood 12 had confronting edges 8 and 14 of a different contour, such as circular, walls 20 of sleeve 2 would be of similar (circular) cross-section in the horizontal plane. To enable sleeve 20 to fit different sizes of barbecues, walls 20 are made up of separate sections, slidably overlapping at the middle of each side as illustrated, and secured together by an appropriate retaining (wing) nut and bolt means 22 passing through elongated apertures or slot 24 in at least one of the overlapping portions of adjacent sections of wall 20. Such overlapping sections 26 of adjacent sections of wall 20 are preferably of mating, stepped configuration as illustrated (FIG. 2). A plurality of inwardly extending projections 27 positioned at a similar height on the inner surfaces of walls 20, are provided to seatably receive and support the grills or grids 28 used for grilling of foods. A series of such projections at different elevations may optionally be provided, to enable grids 28 to be placed at different elevations. Secured to the upper rear external surface of sleeve 2 are a pair of lid attachments 30 corresponding to the type of lid attachment on base 6 to which hood 12 is normally releasably, pivotably hinged. In this way, hood 12 may be pivotally hinged to sleeve 2, so that it may pivot between open position and closed, cooking chamber-forming position with its lower edge 14 supported on the upper edge 32 of walls 20. Appropriate guide projections 34 may be provided towards the front of sleeve 2, projecting upwardly above upper surface 32, to ensure that hood 12 is properly seated on sleeve 2 and supported thereby, when in closed position.

As can be seen in FIG. 1, upper edges 32 of walls 20 of sleeve 2 may be provided with appropriate notches 36 to serve as rotisserie mounts or to receive shish kebob prongs or the like.

To ensure a secure seating of sleeve 2 on barbecue base 6, side bottom snaps 38 are provided at the bottom of walls 20, as illustrated, snaps 38 to releasably engage outer lip 10 of upper rim 8 of base 6. As seen in FIG. 3, side bottom snaps 38 may be outwardly pivotable on pivot 40, and provided with spring means 42 urging snaps 38 inwardly. Inside guide studs 44 are preferably provided, downwardly extending from beyond the lower edges 46 of walls 20 on the inside surfaces thereof, to be snugly seated on the inside surface around the upper rim 8 of barbecue base 6, to ensure a tight, safe fit of sleeve on base 6.

To assist in storage of sleeve 4, the corners 50 may optionally be provided with hinges 52 (FIG. 4) so that the walls may be collapsed about the corners when the sleeve is not in use.

Another option is to provide, at the lower rear edge of sleeve 20, hinge means 54 which releasably connect with a hinge means of the base so that the sleeve may be pivotally secured to the base. In this manner, the hinge may be pivoted upwardly towards the rear of the barbecue, to aid in cleaning and removal of grids 28.

In operation, by releasing the size adjustment wing nut and bolt means 22 on all four sides, the sections making up the four sides of the sleeve can be made shorter or longer so that the sleeve may be made to a size which properly fits barbecue base 6 and hood 12. The nut and bolt means 22 are then tightened to secure the side sections together and the sleeve is seated on upper edges 8 of barbecue base 6, and secured in that position by snaps 38. Cover 12 of barbecue 4 is then releasably fitted onto lide attachment 30 so that it becomes hinged to sleeve 2, pivotable between open and closed positions with respect to sleeve upper edges 32.

Depending upon the heating capacity of the barbecue unit, the expansion sleeve 2 may have walls 20 of a height which for example may be any where from 2" to 12". It will be understood that the effect of the sleeve would be to lift the hood of the barbecue this distance above the base.

Use of an expansion sleeve 2 in accordance with the present invention allows the mounting of a rotisserie on any gas barbecue (as a result of the rotisserie mount notches 36 which it permits) even if such barbecue may not have had this feature originally. Sleeve 2 also permits the cooking of food farther away from the heat source of the barbecue, thereby contributing to better quality cooking and minimizing burning thereof or the food itself catching on fire.

Thus it is apparent that there has been provided in accordance with the invention an expansion sleeve for a gas or charcoal barbecue that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What I claim as my invention:

1. An expansion sleeve for a gas or charcoal barbecue of the type comprising a grill supporting base and a cover which is removably and releasably securable and pivotable with respect to the base with cooperating pivot means secured to the cover and base for this purpose, supportable thereon, the cover having lower edges seatably engaging upper edges of the base when supported thereon and in closed position, the sleeve having vertical walls defining a cross-sectional horizontal shape comforming to the shape of these edges of the base and cover of the barbecue, the walls having spaced parallel upper and lower edges, the lower edges thereof being provided with means to releasably seat the sleeve on the upper edge of the base and the upper edges thereof to seatably receive the cover, means being provided on the walls to slidably adjust the peripheral size of the sleeve to enable it to conform to the peripheral size of the upper edges of the base and the lower edges of the cover of the barbecue, said means comprising separate wall section with overlapping portions slidable with respect to each other and securing means passing through the overlapping portions to permit relative sliding of the side portions with respect to each other to lengthen or shorten the side, the securing means to permit securing of the overlapped portions against relative sliding movement, and pivot means provided on the walls conforming to the pivot means of the base so that the cover may be releasably securable and pivotable thereon to enable the cover to pivot between open and closed positions on the upper edge of the sleeve, the sleeve, when in position on the base of the barbecue with the barbecue cover seated on the upper edges of the sleeve providing an expanded cooking chamber for the barbecue.

2. An expansion sleeve according to claim 1 wherein means are secured to the inner surface of the wall for suppporting thereon the barbecue grill in horizontal orientation.

3. A sleeve according to claim 1 wherein the sleeve is of rectangular cross-sectional shape in the horizontal plane for fitting to a barbecue of rectangular configuration.

4. A sleeve according to claim 1 wherein corresponding means are secured to the inner surfaces of the walls at different heights to enable the barbecue grill to be supported at different heights on the sleeve.

5. A sleeve according to claim 1 wherein the sleeve is provided, near its lower edges, with releasable lock means for releasably gripping the upper edges of the barbecue base to securely seat the sleeve thereon.

6. A sleeve according to claim 5 wherein the releasable lock means comprise spring biased hooks pivotally secured to the outer surfaces of the sleeve walls and of a size and positioned to releasably snap about the upper edges of the base and thereby releasably hold the sleeve in position thereon.

7. A sleeve according to claim 3 wherein the corners of the sleeve are hinged to enable the sleeve to collapse, when not in use, for storage.

8. A sleeve according to claim 1 wherein the upper edges of the sleeve are provided with notches for receiving shish kebab sticks or for mounting therein a rotisserie rod.

* * * * *